US011987346B1

(12) United States Patent
Leung

(10) Patent No.: US 11,987,346 B1
(45) Date of Patent: May 21, 2024

(54) UAV LANDING GEAR WITH SHARED SUSPENSION

(71) Applicant: WING Aviation LLC, Mountain View, CA (US)

(72) Inventor: Ray Leung, Fremont, CA (US)

(73) Assignee: Wing Aviation LLC, Mountain View, CA (US)

( * ) Notice: Subject to any disclaimer, the term of this patent is extended or adjusted under 35 U.S.C. 154(b) by 3 days.

(21) Appl. No.: 18/101,489

(22) Filed: Jan. 25, 2023

Related U.S. Application Data

(63) Continuation-in-part of application No. 18/089,230, filed on Dec. 27, 2022, now abandoned.

(51) Int. Cl.
*B64C 25/62* (2006.01)
*B64C 25/34* (2006.01)

(52) U.S. Cl.
CPC ............. *B64C 25/62* (2013.01); *B64C 25/34* (2013.01)

(58) Field of Classification Search
CPC ................................ B64C 25/34; B64C 25/62
See application file for complete search history.

(56) References Cited

U.S. PATENT DOCUMENTS

| 2,326,210 | A | * | 8/1943 | Falk | B64C 25/02 |
| | | | | | 244/104 R |
| 3,042,345 | A | * | 7/1962 | Holland, Jr. | B64C 25/60 |
| | | | | | 244/100 R |
| 4,142,698 | A | * | 3/1979 | Niebanck | B64C 25/00 |
| | | | | | 244/104 R |
| 5,820,153 | A | * | 10/1998 | Pellerin | B60G 3/20 |
| | | | | | 280/124.179 |
| 8,070,172 | B1 | * | 12/2011 | Smith | B62K 5/05 |
| | | | | | 280/124.135 |
| 8,967,346 | B2 | | 3/2015 | Polakowski et al. | |
| 10,899,436 | B2 | | 1/2021 | Gentry | |
| 2023/0182850 | A1 | * | 6/2023 | Calderon | B62D 7/18 |
| | | | | | 280/269 |

OTHER PUBLICATIONS

Jeek RC Specialties, Horizontal Monoshock, jeekrc.blogspot.com/2013/01/036-horizontal-monoshock.html, Jan. 16, 2013, 2 pages.

(Continued)

*Primary Examiner* — Tye William Abell
(74) *Attorney, Agent, or Firm* — CHRISTENSEN O'CONNOR JOHNSON KINDNESS PLLC

(57) ABSTRACT

A landing gear assembly for an unmanned aerial vehicle (UAV) is described. The landing gear assembly includes a mounting block assembly adapted to mount to a structural frame of a fuselage of the UAV, a shared shock assembly including a spring adapted to provide a spring force and a damper adapted to dampen oscillations of the spring, a pair of leg members extending out from the mounting block assembly, and a pair of pivot blocks each pivotally mounted to the mounting block assembly. The pivot blocks are rigidly connected to a corresponding one of the leg members and pivotally connected to one of opposing ends of the shared shock assembly. The leg members are each connected to a ground gear. An upward suspension travel of one or both of the ground gears rotates one or both of the pivot blocks, thereby compressing the spring.

20 Claims, 9 Drawing Sheets

(56) References Cited

OTHER PUBLICATIONS

Tamiya TamTech Hotshot Project, www.technicopedia.com/RC/HotshotMini/index.html, 2019, 1 page.

Cutler, How the 4 Types of Landing Gear Struts Work, Bold Method, https://www.boldmethod.com/learn-to-fly/systems/how-the-4-types-of-landing gear-struts-work, May 26, 2016, 9 pages.

Mystery Monoshock for Tamiya Frog, https://www.tamiyaclub.com/forum/index.php?/topic/91315-mystery-monoshock-for-tamiya-frog, Nov. 6, 2019, 16 pages.

Traxxas RC Suspension Tuning Guide: Part 3 Shock Position and Roll Center, https://traxxas.com/news/suspension-tuning-guide-part 3, downloaded from internet Nov. 9, 2022, 5 pages.

Bingelis, Spring Steel Landing Gears, EAA Sport Aviation, May 1979, 5 pages.

Tamiya Frog Monoshock Mystery, retrieved from internet https://youtu.be/BCDIr8b4WKc, 3 pages, Nov. 5, 2019.

\* cited by examiner

UAV LANDING GEAR WITH SHARED SUSPENSION

CROSS-REFERENCE TO RELATED APPLICATIONS

This application is a continuation-in-part of U.S. Application Ser. No. 18/089,230, filed on Dec. 27, 2022, the contents of which are incorporated herein by reference.

TECHNICAL FIELD

This disclosure relates generally to landing gear suspensions for unmanned aerial vehicles (UAVs), and in particular but not exclusively, relates to landing gear suspensions for short takeoff and landing (STOL) UAVs.

BACKGROUND INFORMATION

An unmanned vehicle, which may also be referred to as an autonomous vehicle, is a vehicle capable of travel without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, aerial imaging/mapping, public safety, surveillance, or otherwise. The mission definition will often dictate a type of specialized equipment and/or configuration of the unmanned vehicle.

Unmanned aerial vehicles (also referred to as drones) can be adapted for package delivery missions. One type of unmanned aerial vehicle (UAV) that is suitable for package delivery missions is a vertical takeoff and landing (VTOL) UAV. The VTOL capability enables a UAV to pick up packages from almost anywhere and deliver them to almost anywhere. Additionally, VTOL enables a low-touch, scalable delivery operation because the aircrafts are able to perform pre-flight functional checks, takeoff and land within a small footprint, and charge their batteries without human intervention or expensive, bulky ground support equipment that requires significant operator training and real estate.

Unfortunately, VTOL capability significantly limits the range of electric aircraft (compared to a similarly sized fixed wing aircraft) due to the amount of power required to hover and the significant fraction of aircraft mass dedicated to the hover propulsion system. For example, twelve seconds of hover time may be worth one kilometer of cruise range. This is because the aircraft must produce enough thrust to support its entire weight while hovering, whereas in cruising flight only enough thrust to balance the force of aerodynamic drag—typically 5-10 times less than the vehicle's weight—is needed.

When considering UAV configurations suitable for aerial delivery of heavier payloads over longer distances, it may be beneficial to relax—or even eliminate—the VTOL requirement to minimize energy consumption in takeoff, landing, and delivery and to reduce propulsion system weight. That said, it is still desirable to minimize the real estate and ground support infrastructure required to operate non-VTOL UAVs. Accordingly, a fixed-wing UAV designed for longer distance flight carrying heavier payloads while having a short take-off and landing (STOL) capability may be desirable. The STOL capability typically means these UAVs will have a steeper approach angle than normal. The steeper approach angle can result in hard landings. As such, it may be desirable to tailor the landing gear of STOL UAVs to accommodate the greater impact forces that can accompany steeper landing approaches while maintaining a low drag and low weight form factor.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1A:
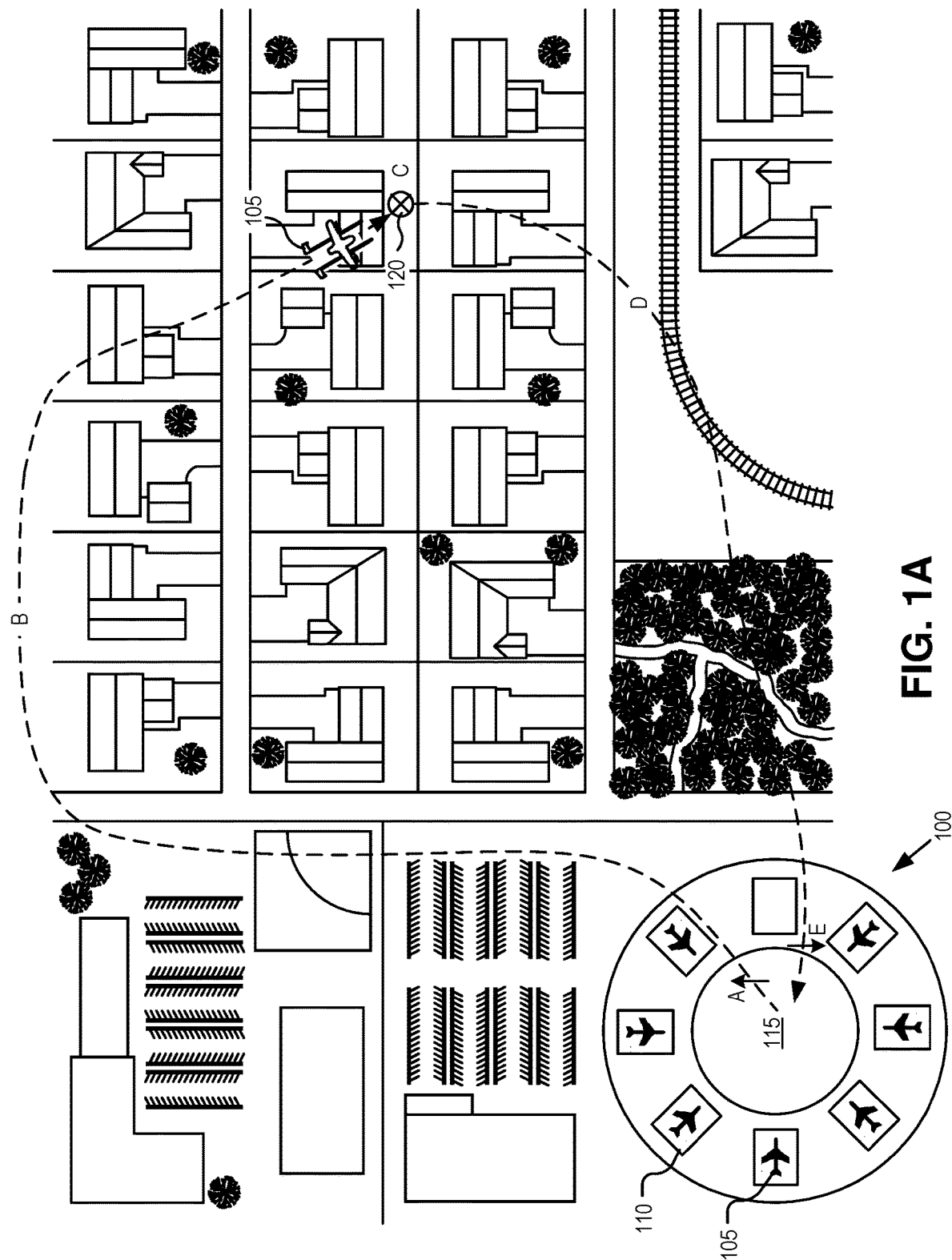
FIG. 1A illustrates a package delivery mission staged from a terminal area and executed by short takeoff and landing (STOL) unmanned aerial vehicles (UAVs), in accordance with an embodiment of the disclosure.

Embodiments of a system, apparatus, and method of operation of a landing gear assembly for an unmanned aerial vehicle (UAV) are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Landing gear is the undercarriage of an aircraft that supports the aircraft when it is on the ground enabling it to land, takeoff, and taxi without damage. The landing gear should be designed to accommodate the weight of the aircraft and bear the loads/shocks that occur during landings. For vertical takeoff and landing (VTOL) aircraft, the takeoffs and landings are generally vertical while conventional aircraft employ gradual, low angle ascents and descents. A short takeoff and landing (STOL) aircraft employs ascent and descent angles that fall between VTOL aircraft and conventional aircraft. The steeper angles can result in higher impact energies than conventional low angle approaches. The impact energies may also be greater than VTOL aircraft, which are typically lighter and have the ability to hover and carefully manage their descent speed right to the ground.

Embodiments of the landing gear assembly described herein share a single shock assembly between opposing side ground gear to reduce weight and complexity while housing most of the landing gear components within the fuselage fairing to provide a low drag implementation. The illustrated embodiment is a monoshock, multistage suspension capable of carrying the loads associated with STOL aircraft without bottoming out and hitting hard stops that may damage, not only the landing gear assembly, but also the aircraft frame and fuselage. Embodiments of the landing gear assembly are capable of dissipating the energy absorbed at impact in a controlled manner, thereby avoiding an uncontrolled flight mode due to rebound that lifts the aircraft off the ground. These benefits are achieved with a low part count, lightweight design utilizing a shock assembly that is shared between the port and starboard side ground gear. Embodiments of the landing gear assembly include flexible leg members and a shared shock assembly with distinct spring constants that can be independently designed/tuned to bear the necessary loads. These two distinct spring components together provide an adjustable, multistage, damped suspension with relatively few suspension components. While the landing gear assembly is adaptable for use with a variety of aircraft types, it is generally suitable for UAVs, and in particular, for STOL UAVs adapted to provide a package delivery service.

UAVs may be provisioned to perform a variety of different mission types, including package delivery, aerial photography, public safety, etc. These UAVs may stage from an operations facility close to the neighborhood being served by a fleet of UAVs. As such, it is desirable to minimize the real estate and ground support infrastructure required to operate non-VTOL UAVs. Specifically, it is desirable to reduce the surface area dedicated to takeoff and landing, so that operations can fit into a public space, like mall parking lots, commercial rooftops, etc. FIG. 1A illustrates an example terminal area 100 staging a plurality of STOL UAVs, such as UAVs 105, that provide a package delivery service to a nearby neighborhood. In the illustrated embodiment, UAVs 105 are staged on charging pads 110 that ring a circular runway area 115.

Each package delivery mission includes a number of segments include a takeoff segment A, a cruise segment B, a package drop-off segment C, a return cruise segment D, and a landing segment E. Take-off segment A includes taxiing along the runway area 115 under high thrust and the initial stages of flight until clearing the perimeter fence of the terminal area 100 while carrying the payload and climbing to cruise altitude. Cruise segment B includes the cruise time to the destination 120 while carrying the package payload. Drop-off segment C includes the flight time surrounding the package drop-off. Cruise segment D includes the cruise time from the destination 120 after dropping off the package and resuming the higher airspeed associated with regular forward cruise until reaching the vicinity of terminal area 100. Landing segment E includes the slower airspeed associated with an approach into runway area 115, touchdown, and the subsequent deceleration and ground roll after touchdown.

Figure 1B:
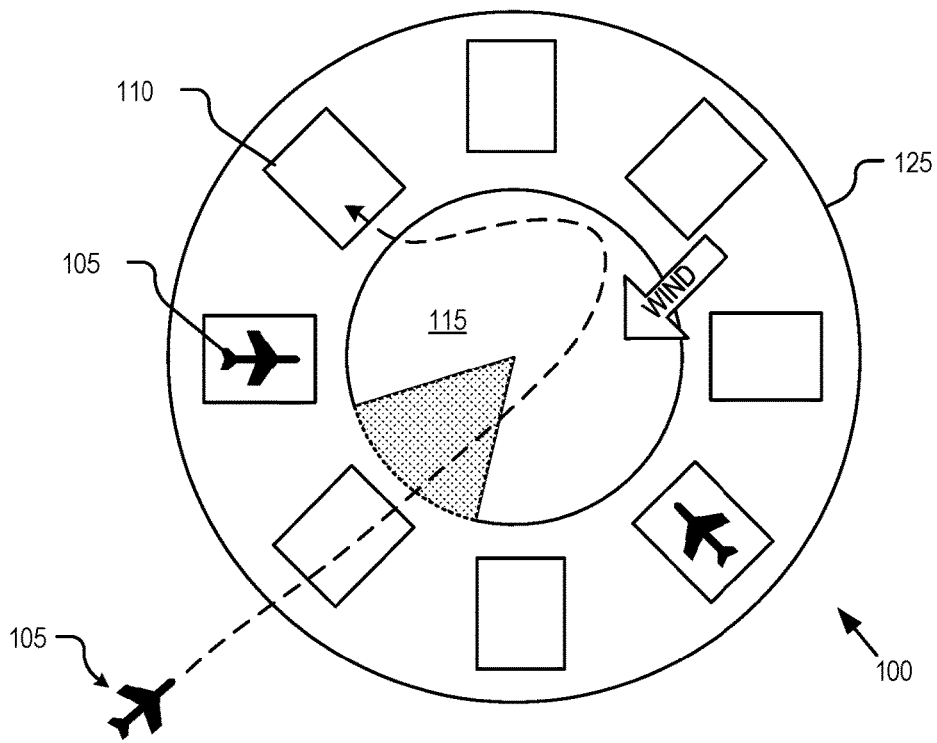
FIG. 1B illustrates a terminal area having a circular runway area for use with STOL UAVs, in accordance with an embodiment of the disclosure.

FIG. 1B illustrates greater detail of terminal area 100 having a circular runway area 115 for use with UAVs 105, in accordance with an embodiment of the disclosure. As illustrated, terminal area 100 includes charging pads 110 arrayed around the perimeter of circular runway area 115 for charging UAVs 105 while the outer perimeter 125 may be lined with a security fence or wall. In one embodiment, circular runway area 115 has a diameter of approximately 90 ft while outer perimeter 125 has a diameter D1 of 100 ft and the perimeter fence/wall has a height H1 of 8 ft (see FIG. 1C). Of course, other dimensions and shapes may be implemented.

Figure 1C:
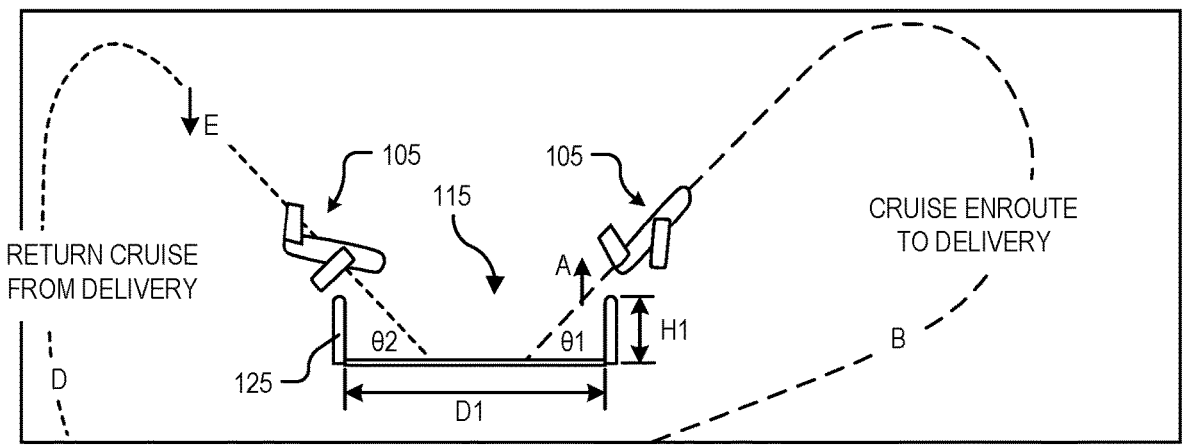
FIG. 1C illustrates landing and takeoff segments of a package delivery mission executed by a STOL UAV, in accordance with an embodiment of the disclosure.

The STOL characteristics of UAVs 105 facilitate the circular shape of runway area 125 within a reasonable sized footprint. In turn, the circular shape of runway area 125 enables UAVs 105 to approach and depart from any direction. This flexibility permits UAVs 105 to approach and depart into the wind (within a feasible approach/departure wedge) thereby reducing issues associated with crosswinds and maintaining short takeoff and landing distances. FIG. 1C illustrates how UAV 105 executes slow and steep landings (arrivals) and takeoffs (departures). In some embodiments, departure paths having a climb angle $\theta 1$ of 50 degrees and arrival paths having an approach angle $\theta 2$ of 18 degrees may be implemented. These steep arrivals and departures may be accomplished with distributed propulsion providing blown control and lift surfaces along with a robust landing gear assembly to bear the initial impact forces and control the rebound response.

Figure 2A:
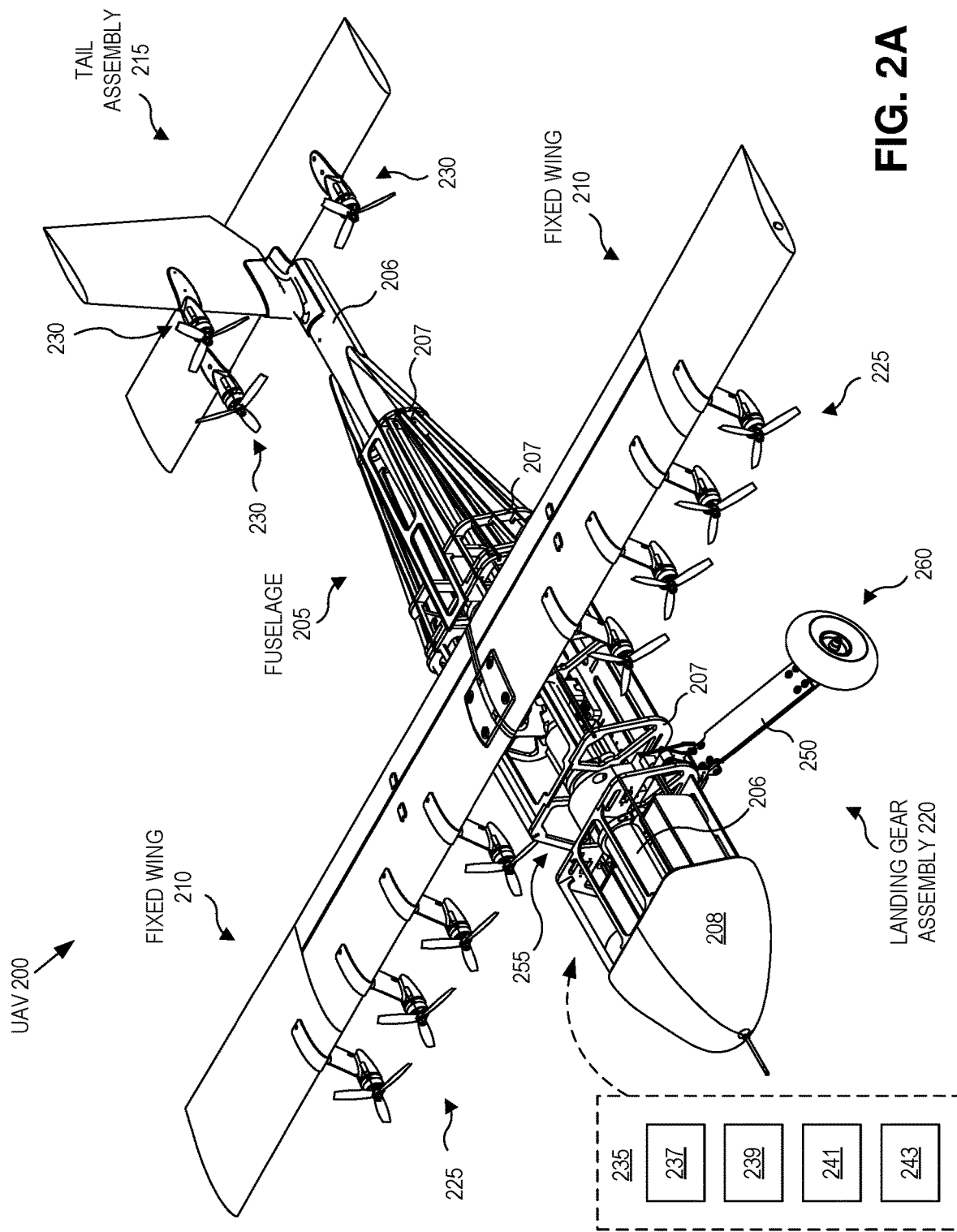
FIG. 2A is a perspective view illustration of a STOL UAV with multistage suspension to accommodate high impact landings, in accordance with an embodiment of the disclosure.
Figure 2B:
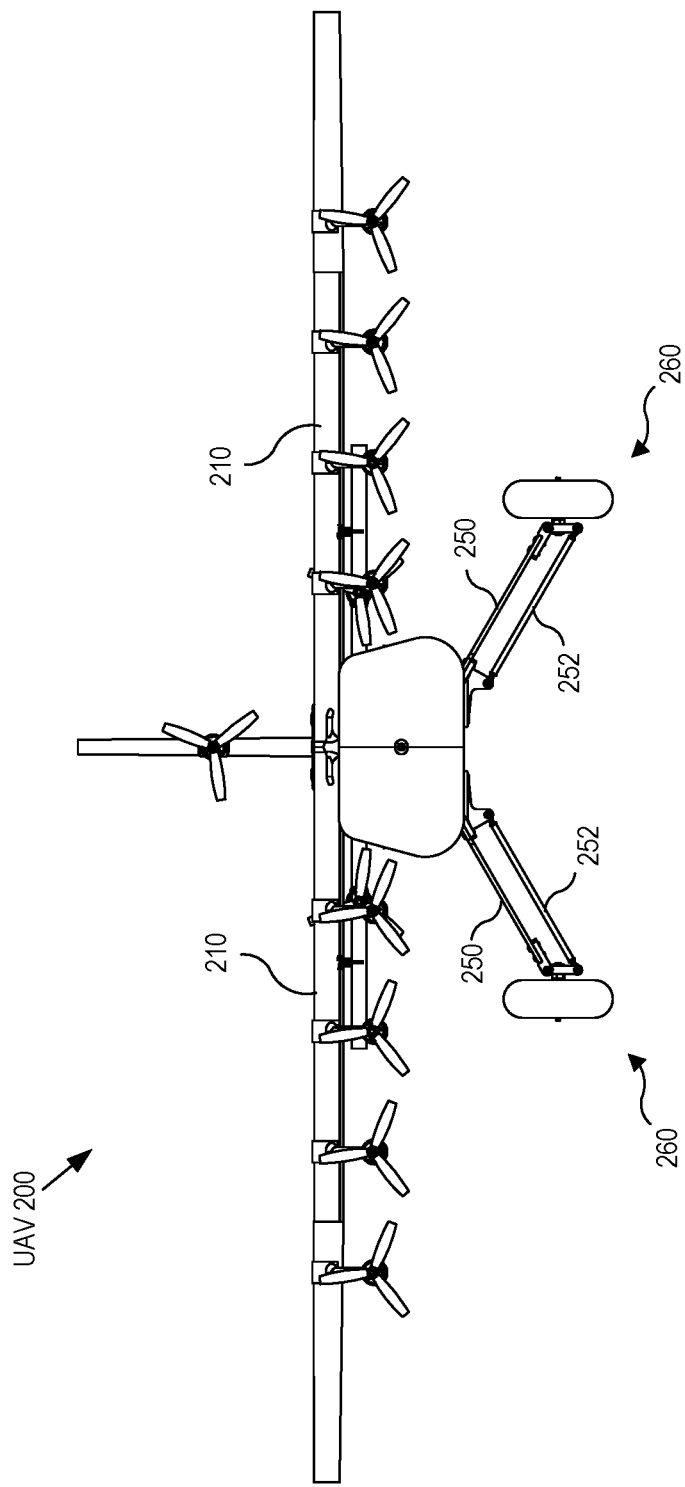
FIG. 2B is a front view illustration of the STOL UAV, in accordance with an embodiment of the disclosure.
Figure 2C:
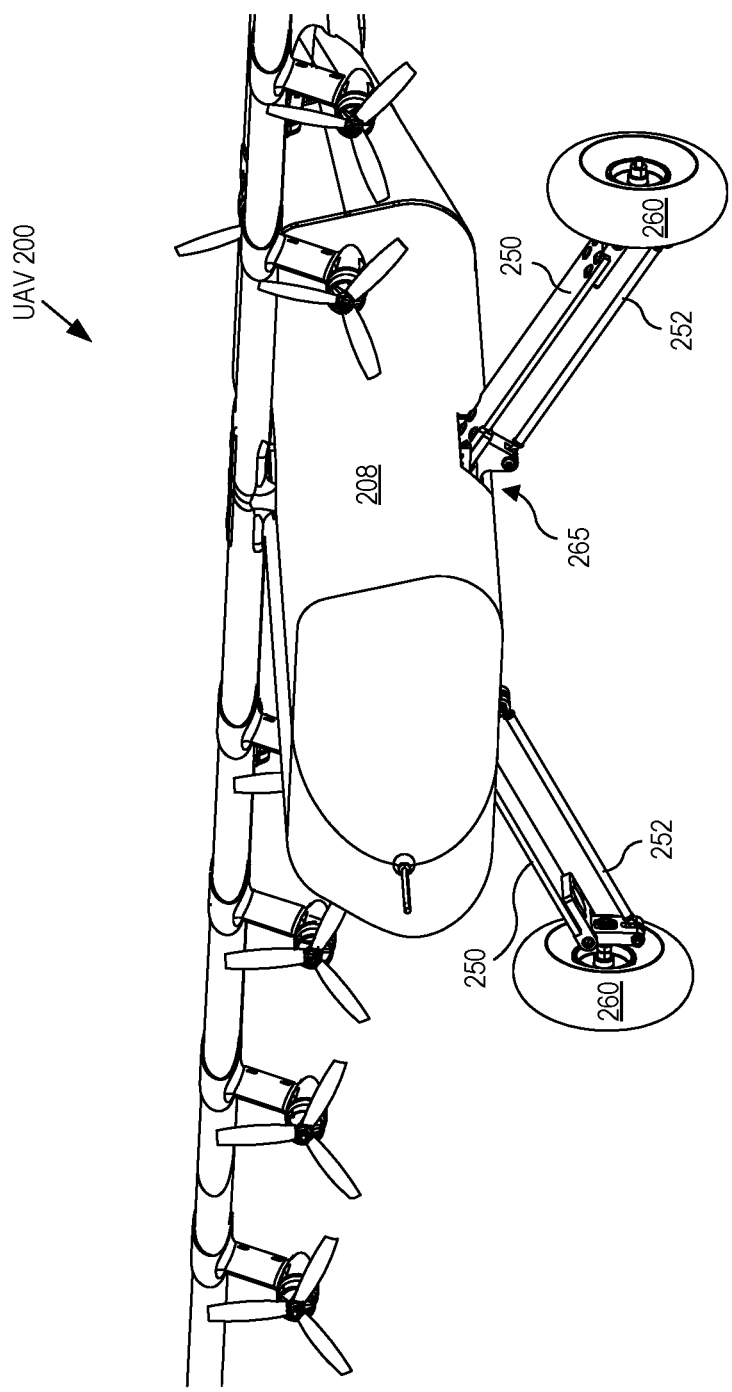
FIG. 2C is a closeup perspective view illustration of the STOL UAV depicting how the shared shock assembly of the landing gear is entirely housed within the fairing of the fuselage, in accordance with an embodiment of the disclosure.

FIGS. 2A-C illustrate a UAV 200 with STOL characteristics and a landing gear assembly having a shared shock assembly, in accordance with an embodiment of the disclosure. UAV 200 is one possible implementation of UAVs 105. FIG. 2A is a perspective view illustration of UAV 200, FIG. 2B is a front view illustration, and FIG. 2C is a closeup perspective view illustration of the same. The illustrated embodiment of UAV 200 includes a fuselage 205, a pair of fixed wings 210, a tail assembly 215, a landing gear assembly 220, distributed propulsion units 225 and 230, and on-board circuitry 235. The illustrated embodiment of fuselage 205 includes a structural frame (or airframe) formed from a central structural member 206, bulkhead ribs 207, and a fuselage skin (or fairing) 208 (only the nose cone portion is illustrated in FIG. 2A). The illustrated embodiment of fixed wings 210 have an aerodynamic shape to provide lift along with control surfaces such as ailerons and flaps. The illustrated embodiment of tail assembly 215 includes horizontal stabilizers having elevators and a vertical stabilizer having a rudder. The illustrated embodiment of on-board circuitry 235 includes a controller 237, a battery unit 239, sensors 241, and communication circuitry 243.

UAV 200 is a STOL aircraft adapted for package delivery missions. UAV 200 has a fixed wing targeting a larger payload capacity and extended range over a VTOL UAV of similar size and weight. Distributed propulsion units 225 are mounted to fixed wings 210 with their propeller blades positioned fore of the leading edge of fixed wings 210 to provide a blown surface for augmented lift at low airspeeds. Similarly, distributed propulsion units 230 are mounted to tail assembly 215 inline with their corresponding stabilizers to provide a blown surface having increased control authority at low airspeeds. The blown lift and control surfaces aid the STOL characteristics of UAV 200. In turn, as discussed in further detail below, landing gear assembly 220 provides a robust undercarriage capable of sustaining and controlling the higher impact and rebound forces associated with the steep approach angles of a STOL aircraft.

In the illustrated embodiment, the airframe of UAV 200 includes central structural member 206 extending along a fore-to-aft longitudinal axis of UAV 200. Bulkhead ribs 207 are mounted to and encircle central structural member 206 at a plurality of different locations along the fore-to-aft longitudinal axis. Bulkhead ribs 207 may define a number of different internal compartments. For example, in one embodiment, a fore compartment houses battery 239 while the mid and aft compartments house a payload bay for carrying and a deploying package. Other electronics including controller 237, sensors 241, and communication circuitry 243 may be housed throughout one or more of these compartments. Of course, one or more of these components may span multiple compartments and be disposed in other locations. The internal components are protected by fairing 208, which wraps around bulkhead ribs 207. Central structural member 206 is the primary structural member of the aircraft, to which the other primary components mount. In the illustrated embodiment, tail assembly 215 mounts to an aft portion of central structural member 206 while fixed wings 210 and landing gear assembly 220 mount to a mid-section of central structural member 206. Central structural member 206 may be implemented as a tube or rod fabricated from a variety of rigid, lightweight materials such as aluminum, carbon fiber composite, or otherwise.

The illustrated embodiment of landing gear assembly 220 includes leg members 250, control rods 252, a shared suspension assembly 255, a mounting block assembly (not fully illustrated in FIGS. 2A-C), and ground gear 260. The landing gear assembly 220 is mounted to the airframe via the mounting block assembly, which is pivotally linked to proximal ends of leg members 250 via pivot blocks and pivotally linked to proximal ends of control rods 252 via rod anchors (e.g., see FIG. 3).

Leg members 250 and control rods 252 extend out from opposing sides of the fuselage 205 through openings 265 and connect to ground gear 260. Leg members 250 and control rods 252 are flexible members that are pivotally connected to the mounting block assembly via various linkages. Leg members 250 contribute their own spring constants to shared suspension assembly 255 thereby contributing to the overall multistage stage suspension of landing gear assembly 220. Leg members 250 physically offset ground gear 260 from fuselage 205, providing adequate clearance for suspension travel and avoiding bottoming out of the underbelly of fuselage 205 during initial impact. Leg members 250 and control rods 252 are streamlined, presenting narrow profiles to the direction of airflow for reduced drag while shared suspension assembly 255 is housed within a fairing cross-section of fuselage 205 out of the ambient airflow. In the illustrated embodiment, leg members 250 have a rectangular cross-section while control rods 252 have a circular cross-section; however, other cross-sectional shapes may be employed.

Shared shock assembly 255 connects between pivot blocks mounted to proximal ends of leg members 250 and provides spring resistance and shock damping to the overall landing gear assembly 220. As the name implies, shared shock assembly 255 is shared by both the starboard and port side ground gears, providing a spring force and oscillation damping that is also shared. In the illustrated embodiment, shared suspension assembly 255 is housed within fuselage 205 such that the spring and damper are shielded within the fairing cross-section of fuselage skin 208 even when the suspension is fully extended during flight, thereby reducing drag from landing gear assembly 220. Referring to the embodiment illustrated in FIG. 2C, only leg members 250, control rods 252, and ground gear 260 are presented to the ambient airflow outside fuselage 205 during flight.

In the illustrated embodiment, ground gear 260 is exposed running gear with wheels; however, low-drag wheel pants may be added over the wheels for improved aerodynamics. Running gear is suitable for STOL aircraft intended for ground landings on a smooth surface (e.g., tarmac runway). However, other types of ground gear may be mounted to the distal ends of leg members 250 including skids, pontoons, pads, telescoping feet, etc. Furthermore, in some embodiments (particularly embodiments that do not include running gear wheels) control rods 252 may be omitted. While landing gear assembly 220 is particularly well suited for STOL UAVs, it should be appreciated that embodiments of landing gear assembly 220 are also applicable to other types of UAVs including VTOL UAVs, conventional UAVs, float plane UAVs, etc.

Figure 3:
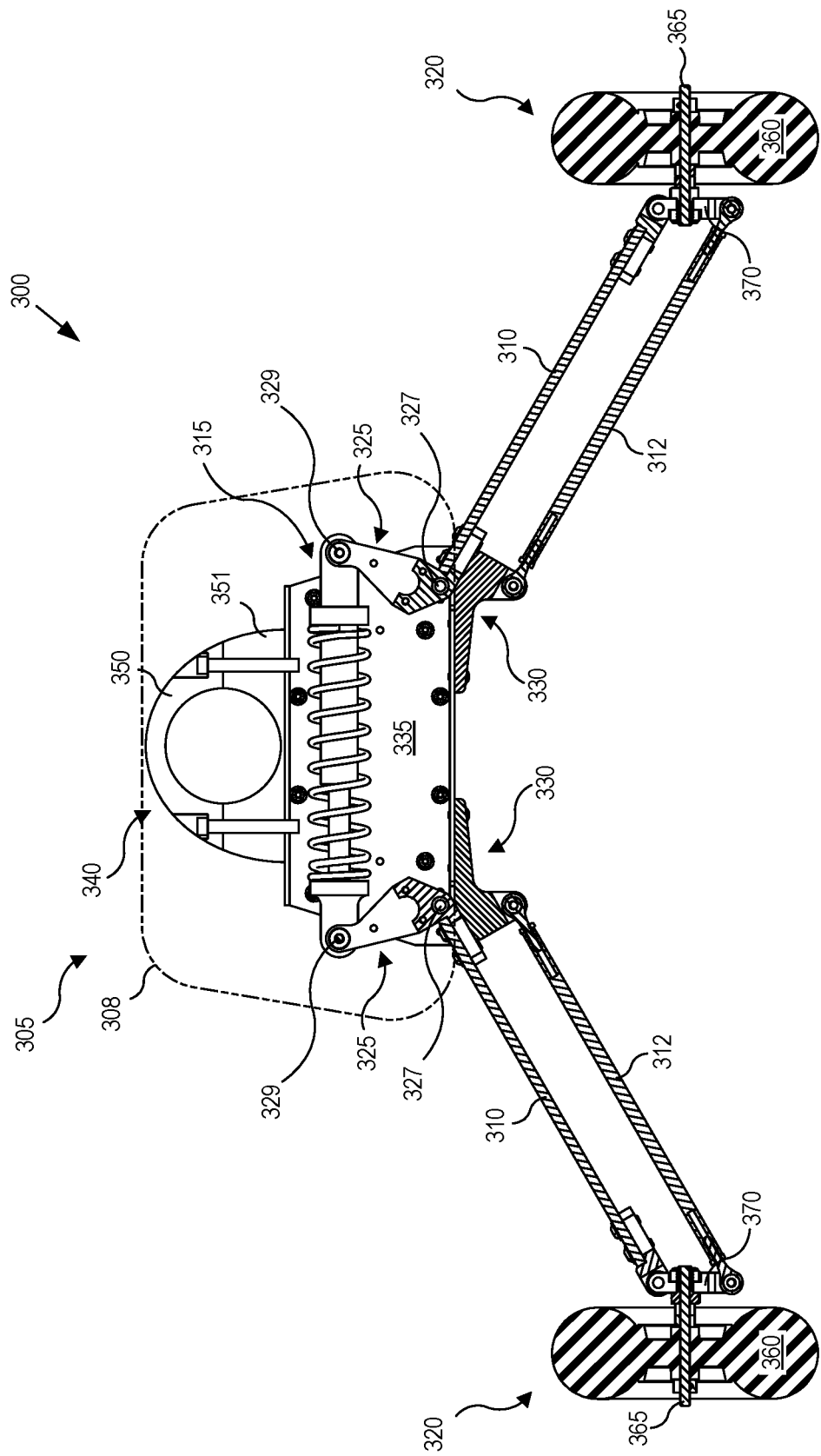
FIG. 3 is a cross-sectional illustration of a landing gear assembly having a shared shock assembly for use in STOL UAVs, in accordance with an embodiment of the disclosure.
Figure 4A:
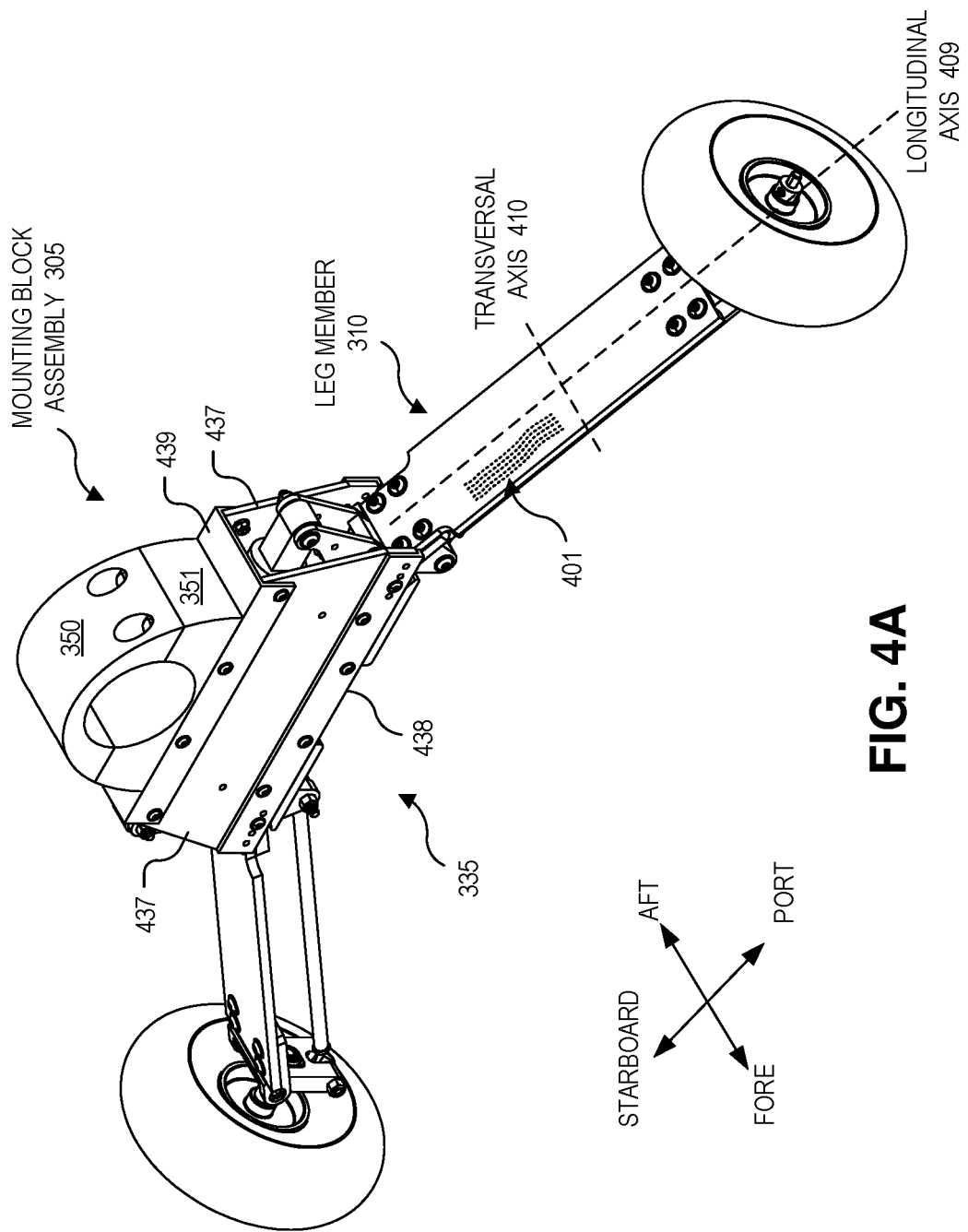
FIG. 4A is a perspective view illustration of the mounting block assembly and leg members of the landing gear assembly, in accordance with an embodiment of the disclosure.
Figure 4B:
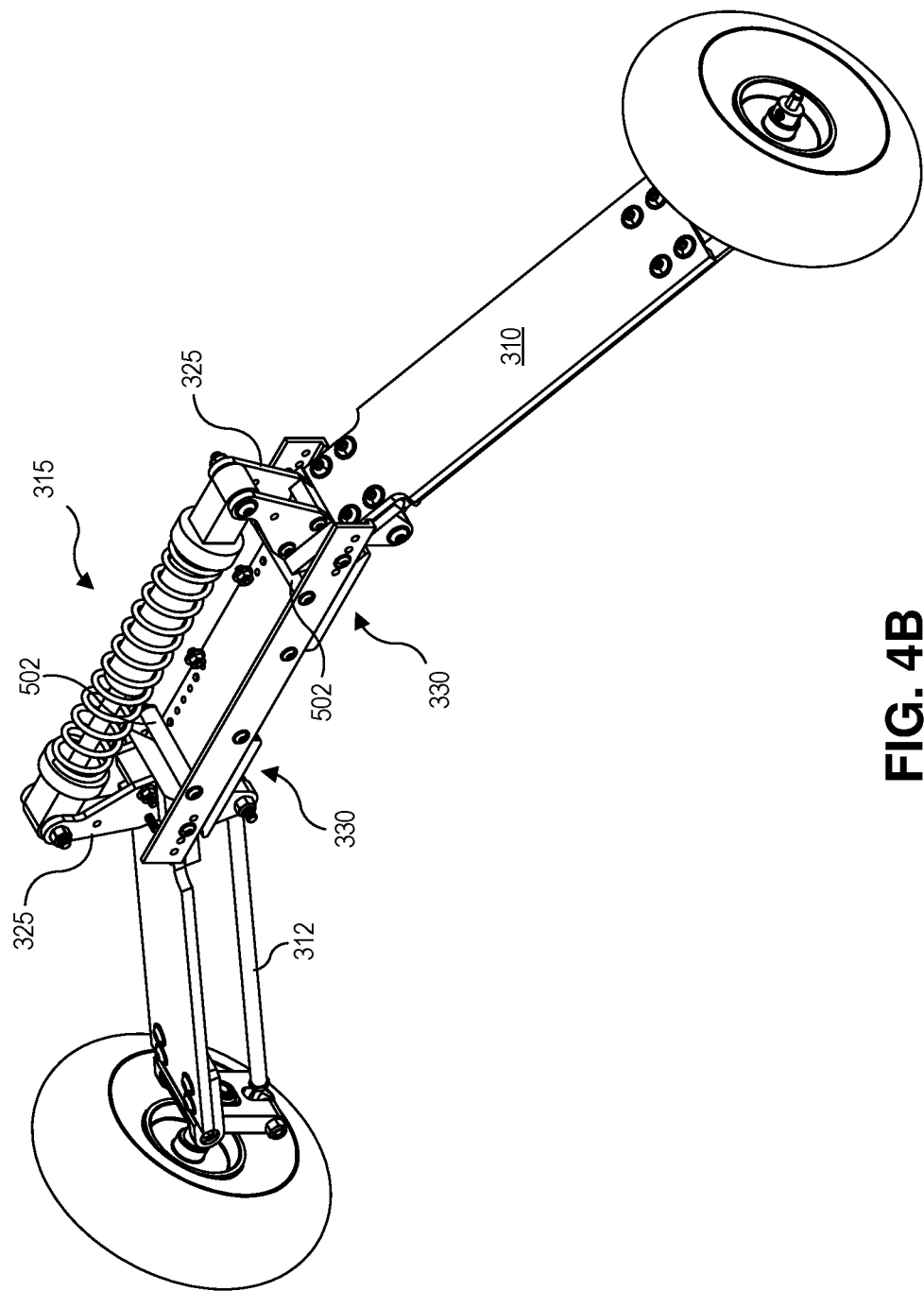
FIG. 4B is a perspective view illustration of the mounting block assembly with portions of the spring box removed to expose the spring and damper, in accordance with an embodiment of the disclosure.

FIG. 3 is a cross-section illustration of a landing gear assembly 300, in accordance with an embodiment of the disclosure. Landing gear assembly 300 is one possible implementation of landing gear assembly 220 illustrated in FIGS. 2A-C. FIGS. 4A and 4B are perspective illustrations of landing gear assembly 300 that better illustrate relevant aspects. The illustrated embodiment of landing gear assembly 300 includes a mounting block assembly 305, a pair of leg members 310, a pair of control rods 312, a shared shock assembly 315, ground gear 320, pivot blocks 325, and rod anchors 330. The illustrated embodiment of mounting block assembly 305 includes a spring box 335 and a clamping collar 340 formed by upper and lower collars 350 and 351 (see also FIG. 4). The illustrated embodiment of shared shock assembly 305 includes a spring disposed over a damper (e.g., a single coilover strut). The illustrated embodiment of ground gear 320 is running gear each including a wheel 360, an axle hub 365, and a knuckle 370. The illustrated embodiment of spring box 335 encircles shared shock assembly 315 and includes side plates 437, bottom plate 438, and top plate 439 (see FIG. 4A).

Leg members 310 extend out past sides of fuselage fairing 308 to provide a wide, stable landing stance. Leg members 310 also provide offset between landing gear 320 and the underbelly of fuselage fairing 308 to provide sufficient upward suspension travel upon landing to absorb impact energies in a safe and controlled manner. Control rods 312 extend along and beneath leg members 310. In the illustrated embodiment, leg members 310 are flattened members having a narrow edge surface facing fore and aft for reduced drag and a wide side surface obliquely facing port and starboard sides. In the illustrated embodiment, control rods 312 are rods with circular cross-sections. Of course, the specific cross-sectional shapes of leg members 310 and control rods 312 may be varied from those illustrated.

Leg members 310 are rigidly connected at their proximal ends to pivot blocks 325 and pivotally connected at their distal ends to the topside of knuckles 370. Correspondingly, control rods 312 are pivotally connected at their proximal ends to rod anchors 330 and pivotally connected at their distal ends to the bottom sides of knuckles 370. The linkage formed by leg members 310, control rods 312, and knuckles 370 permit suspension travel along a vertical axis 505 (see FIG. 5) while maintaining axle hubs 365 rotating substantially about horizontal axes 510 throughout the suspension travel. This reduces lateral or oblique forces on wheels 360, which can prematurely wear out tire tread or even separate the tires from their rims due to a cambering effect under compression.

Figure 5:
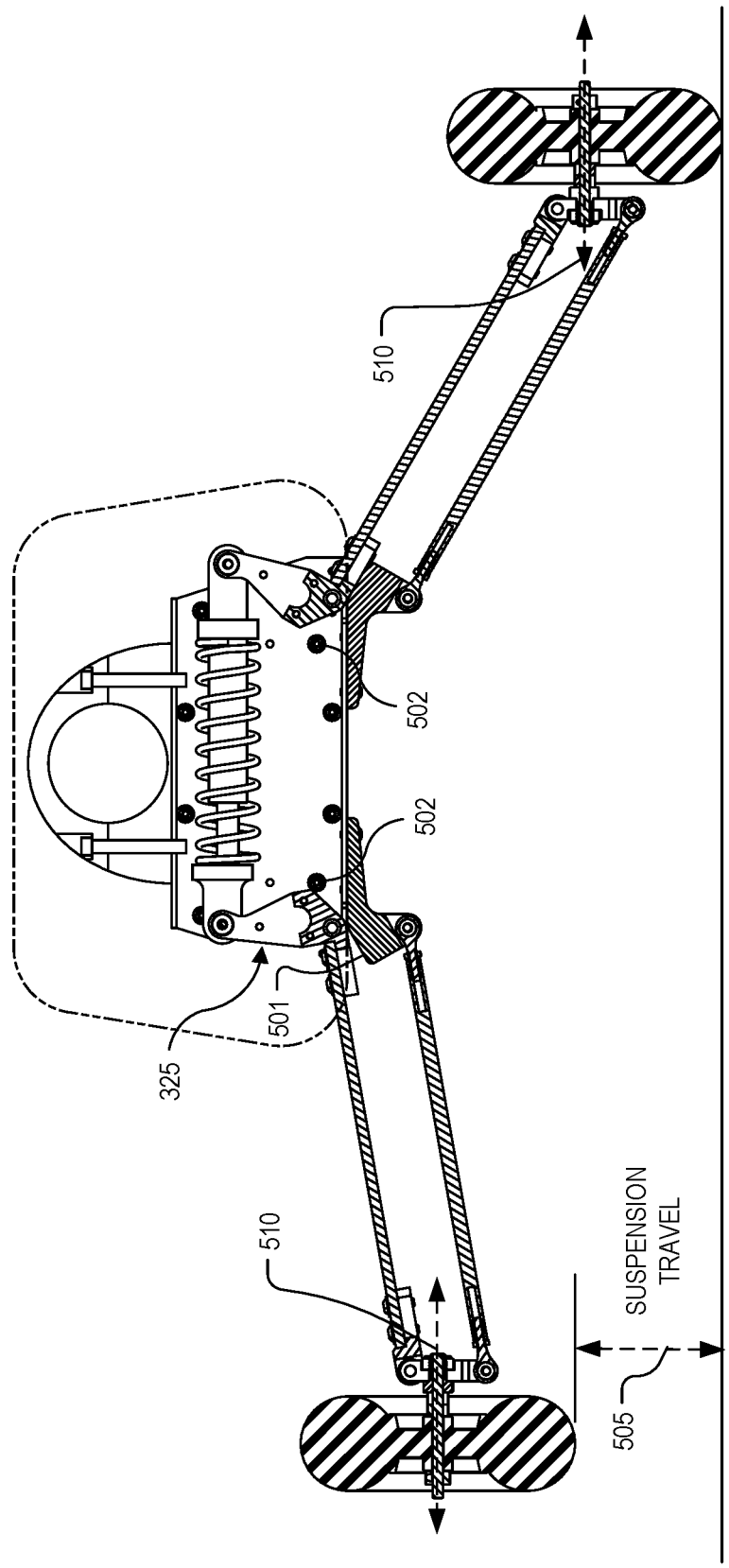
FIG. 5 is a cross-sectional view of the landing gear assembly illustrating interaction between the multiple spring constants providing a multistage damped response, in accordance with an embodiment of the disclosure.

Upon landing, ground gear 320 travels upward causing pivot blocks 325 to rotate about their pivot mounts 327 to mounting block assembly 305. The rotation of one (or both) of pivot blocks 325 compresses shared shock assembly 315. Shared shock assembly 315 resists this compression with the spring force generated by the spring (e.g., coil spring) and the damping provided by the damper (e.g., piston dashpot). Shared suspension assembly 315 is pivotally connected at each of its opposing ends (pivot joints 329) to a corresponding one of pivot blocks 325, such that pivot joints 329 rotate inward about pivot mounts 327, compressing the spring in response to suspension travel. In the illustrated embodiment, shared shock assembly 315 is horizontally suspended (relative to the fuselage) between pivot blocks 325 such that a central axis through the spring aligns with a starboard-to-port axis at some point during the suspension travel of ground gear 320. While the pivoting of just one side of landing gear 320 (e.g., see FIG. 5 illustrating compression of just one side of ground gear 320) can result in a small attitude deviation of shared shock assembly 315 relative to fuselage fairing 308. However, shared shock assembly 315 remains relatively horizontal taking advantage of the width of the fuselage fairing 308 for spring and damper travel. However, as illustrated, both the spring and damper of shared shock assembly 315 remain shrouded within fuselage fairing 308 throughout the full suspension travel. This avoids aerodynamic drag that would otherwise occur by exposing components of shared shock assembly 315 to the ambient airflow around fuselage fairing 308.

Anchor blocks 330 provide pivot mount locations for the proximal ends of control rods 312 that are mounted offset below leg members 310. Anchor blocks 330 also include angled surfaces 501 (see FIG. 5) that interface with the bottom side of leg members 310 and serve as pivot stops to pivot blocks 325, thereby limiting the downward suspension travel of leg members 310. Angled surfaces 501 may also be referred to as lower travel limiters. Conversely, pins 502 (see FIGS. 4B and 5) extend between side plates 437 and are positioned relative to pivot blocks 325 to operate as upper travel limiters or hard stops when pivots blocks 325 rotate inwards to their terminal positions under full compression of either side of the suspension. Rotational travel of each pivot block 325 is independently limited by an angled surface 501 and a pin 502. In one embodiment, anchor blocks 330 also provide linear position adjustments enabling the pivot joints between control rods 312 and anchor blocks 330 to be independently slid laterally along a starboard-to-port axis. This lateral adjustment enables fine tuning of the suspension geometry to achieve appropriate vertical alignment of knuckles 370. This lateral adjustment may be achieved with multiple mounting positions between anchor blocks 330 and plate member 438. In yet another embodiment, the interface surfaces between anchor blocks 330 and the underside of spring box 335 (plate member 438) form linear gears or racks that can be adjusted laterally in one tooth increments. In this embodiment, mechanical fasteners may be used to secure anchor blocks 330 to spring box 335. Of course, other adjustable mechanical interfaces between anchor blocks 330 and spring box 335 may be implemented.

Leg members 310 may be fabricated of a variety of materials, such as various metal alloys (e.g., aluminum 6061-T6), composite materials (e.g., carbon fiber), or otherwise. In some embodiments, leg members 310 and/or control rods 312 are fabricated of a flexible material to contribute to the overall shock absorbing of landing gear assembly 300. In one embodiment, leg members 310 are fabricated of a material having a grain structure 401 oriented to be stiffer along a longitudinal axis 409 than a transversal axis 410. In the illustrated embodiment, this stiffer orientation aligns grain structure 401 to be parallel with longitudinal axis 409. In the examples of aluminum alloy, grain structure 401 is selected by the direction the metal alloy is rolled during manufacture while grain structure 401 of carbon fiber composite is associated with the carbon fibers embedded within the surrounding resin of the composite material. Appropriate selection of grain direction can increase strength and the spring constant associated with leg members 310 for a given size, weight, and mechanical cross-section of these members.

Mounting block assembly 305 serves multiple purposes. First, mounting block assembly 305 provides mounting points for pivot blocks 325 and rod anchors 330. Second, mounting block assembly 305 secures landing gear assembly 300 into UAV 200 and transfers impact load forces to the structural frame of UAV 200. Mounting block assembly 305 accomplishes these purposes with few components having relative low mass. Mounting block assembly 305 may be fabricated of various materials including lightweight alloys, aluminum, composite materials (e.g., carbon fiber), or otherwise.

In the illustrated embodiment, mounting block assembly 305 includes clamping collar 340 for securing directly onto central structural member 206 of the fuselage frame (see FIGS. 2A and 4). This mechanical clamp may be facilitated with mechanical fasteners that extend through upper collar 350, lower collar 351, and thread into the topside of spring box 335. The mechanical fasteners provide a mechanical clamping force via upper and lower collars 350 and 351 to the frame of UAV 200 and specifically clamp around central structural member 206.

The illustrated embodiment of shared shock assembly 315 includes a single spring and damper that are both shared by the starboard and port sides ground gears. Of course, the single spring and damper may be replaced with multiple springs and dampers that are all shared by the starboard and port sides ground gears. The illustrated spring and damper have a coilover mono-shock strut configuration using a coil spring disposed over a liquid filled damper piston (e.g., piston dashpot). However, the coilover configuration represents just one possible implementation, which may be varied in several respects. For example, the coilover may be replaced with a linear spring-loaded guide, the coil spring may be separated from the damper (e.g., non-coilover configuration), a liquid damper may be replaced with other forms of dampers, etc.

Leg members 310, control rods 312, and the coil spring of shared shock assembly 315 collectively provide a multistage suspension. Each of these components contributes a spring force to the overall suspension response. The spring of shared shock assembly 315, the fluid in the damper, and the flexibility of leg members 310 and control rods 312 provide suspension travel to absorb impact energy while the damper of shared shock assembly 315 controls the rebound rate and dissipates the impact energy in a controlled manner. The damper resists motion of the spring (e.g., via viscous friction), absorbing kinetic energy and ensuring that oscillations of the landing gear decay at a desired rate.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An unmanned aerial vehicle (UAV), comprising:
a fuselage including a structural frame; and
a landing gear assembly adapted to absorb an impact shock when the UAV lands, the landing gear assembly including:
  a mounting block assembly mounted to the structural frame;
  a shared shock assembly including a spring adapted to provide a spring force and a damper adapted to dampen oscillations of the spring;
  a pair of leg members extending out past sides of the fuselage, wherein a distal end of each of the leg members is connected to a corresponding one of a first side ground gear or an opposing side ground gear; and
  a pair of pivot blocks each pivotally mounted to the mounting block assembly, rigidly connected to a corresponding one of the leg members, and pivotally connected to one of opposing ends of the shared shock assembly,
  wherein an upward suspension travel of one or both of the first side or opposing side ground gears rotates one or both, respectively, of the pivot blocks, thereby compressing the spring.

2. The UAV of claim 1, wherein the spring and the damper are entirely enclosed within a fairing cross-section of the fuselage throughout a complete suspension travel of both the first side and opposing side ground gears.

3. The UAV of claim 1, wherein the shared shock assembly is substantially horizontally oriented relative to the fuselage such that a central axis through the spring substantially aligns with a starboard-to-port axis at some point during a suspension travel of the first side or opposing side ground gear.

4. The UAV of claim 1, wherein the shared shock assembly comprises a monoshock coil spring disposed over a piston dashpot.

5. The UAV of claim 1, wherein the structural frame of the fuselage includes a central structural member extending along a fore-to-aft longitudinal axis of the fuselage and wherein the mounting block assembly includes:
a clamping collar that clamps around the central structural member, wherein the pivot blocks are each pivotally mounted to the mounting block assembly below the clamping collar.

6. The UAV of claim 1, wherein the leg members are flexible.

7. The UAV of claim 6, wherein the leg members each have a narrow edge surface facing fore or aft and a wide side surface facing port or starboard, and wherein the leg members are fabricated of a material having a grain structure oriented to be stiffer along a longitudinal axis of each of the leg members running from the distal end to a proximal end than along a transversal axis running fore-to-aft.

8. The UAV of claim 1, further comprising:
rod anchors mounted to an underside of the mounting block assembly; and
a pair of control rods each extending along and beneath a corresponding one of the leg members, each of the control rods pivotally connected at a first end to one of the rod anchors and at a second end to one of the first side or opposing side ground gear.

9. The UAV of claim 8, wherein the control rods and the leg members are flexible.

10. The UAV of claim 8, wherein the first side and opposing side ground gears are running gears with wheels, the UAV further comprising:
a knuckle mounted to an axle hub of each of the wheels, wherein the knuckle is pivotally connected above the axle hub to one of the leg members and pivotally connected below the axle hub to one of the control rods.

11. The UAV of claim 8, wherein each of the rod anchors is adjustably mounted to the underside of the mounting block assembly to facilitate a translational adjustment along a port-to-starboard axis.

12. A landing gear assembly for an unmanned aerial vehicle (UAV), the landing gear assembly comprising:
a mounting block assembly adapted to mount to a structural frame of a fuselage of the UAV;
a shared shock assembly including a spring adapted to provide a spring force and a damper adapted to dampen oscillations of the spring;
a pair of leg members extending out from the mounting block assembly, wherein a distal end of each of the leg members is connected to a corresponding one of a first side ground gear or an opposing side ground gear; and
a pair of pivot blocks each pivotally mounted to the mounting block assembly, rigidly connected to a corresponding one of the leg members, and pivotally connected to one of opposing ends of the shared shock assembly,
wherein an upward suspension travel of one or both of the first side or opposing side ground gears rotates one or both, respectively, of the pivot blocks, thereby compressing the spring.

13. The landing gear assembly of claim 12, wherein the shared shock assembly comprises a monoshock coil spring disposed over a piston dashpot.

14. The landing gear assembly of claim 12, wherein the mounting block assembly includes:
a clamping collar that clamps around a central structural member of the structural frame, wherein the pivot blocks are each pivotally mounted to the mounting block assembly below the clamping collar.

15. The landing gear assembly of claim 12, wherein the leg members are flexible.

16. The landing gear assembly of claim 15, wherein the leg members each have a narrow edge surface facing fore or aft and a wide side surface facing port or starboard, and wherein the leg members are fabricated of a material having a grain structure oriented to be stiffer along a longitudinal axis of each of the leg members running from the distal end to a proximal end than along a transversal axis running fore-to-aft.

17. The landing gear assembly of claim 12, further comprising:
- rod anchors mounted to an underside of the mounting block assembly; and
- a pair of control rods each extending along and beneath a corresponding one of the leg members, each of the control rods pivotally connected at a first end to one of the rod anchors and at a second end to one of the first side or opposing side ground gear.

18. The landing gear assembly of claim 17, wherein the control rods and the leg members are flexible.

19. The landing gear assembly of claim 17, wherein the first side and opposing side ground gears are running gears with wheels, the landing gear assembly further comprising:
- a knuckle mounted to an axle hub of each of the wheels, wherein the knuckle is pivotally connected above the axle hub to one of the leg members and pivotally connected below the axle hub to one of the control rods.

20. The landing gear assembly of claim 17, wherein each of the rod anchors is adjustably mounted to the underside of the mounting block assembly to facilitate a translational adjustment along a port-to-starboard axis.

* * * * *